United States Patent [19]

Takami et al.

[11] 4,285,055
[45] Aug. 18, 1981

[54] SELF-LUMINESCENT LIGHT SOURCE FOR LIQUID CRYSTAL DISPLAY WATCH

[75] Inventors: Katsumi Takami, Tokyo; Takashi Matsuzawa, Musashino, both of Japan

[73] Assignee: Hitachi, Ltd., Tokyo, Japan

[21] Appl. No.: 30,703

[22] Filed: Apr. 16, 1979

[30] Foreign Application Priority Data

Apr. 21, 1978 [JP] Japan .................................. 53-46544

[51] Int. Cl.³ .............................................. G04B 19/32
[52] U.S. Cl. .................................... 368/226; 368/239; 368/242; 368/82; 368/84
[58] Field of Search ............. 350/345; 58/50 R, 50 A; 340/765, 784; 368/239, 242, 82, 84, 226

[56] References Cited

U.S. PATENT DOCUMENTS

| | | | |
|---|---|---|---|
| 1,388,855 | 8/1921 | Fordyce | 58/50 A X |
| 2,885,561 | 5/1959 | Lange | 58/50 A |
| 3,950,078 | 4/1976 | Zatsky | 350/345 |
| 4,104,627 | 8/1978 | Thuler | 350/345 X |
| 4,126,384 | 11/1978 | Goodman et al. | 350/345 |

FOREIGN PATENT DOCUMENTS

42-21554  9/1967  Japan ......................... 58/50 A

*Primary Examiner*—Ulysses Weldon
*Attorney, Agent, or Firm*—Craig and Antonelli

[57] ABSTRACT

A self-luminescent light source for a liquid crystal display watch characterized by comprising a fluorescent substance layer which has a light reflectivity and which contains radioactive element promethium ($^{147}$Pm) in at least a part thereof, a reflective layer which is disposed on one surface of the fluorescent substance layer and which serves to reflect and scatter fluorescence from the fluorescent substance layer, a case which is disposed on the side of the reflective layer remote from the fluorescent substance layer and which serves to perform shielding from Bremsstrahlung ascribable to beta rays given out from the promethium, a first cover which is disposed on the side of the fluorescent substance layer remote from the reflective layer and which serves to absorb the beta rays given out from the promethium and to transmit the light from the fluorescent substance layer, and a second cover which is disposed on the side of the first cover remote from the fluorescent substance layer and which serves to perform shielding from Bremsstrahlung ascribable to the beta rays given out from the promethium and to transmit the light from the fluorescent substance layer.

15 Claims, 4 Drawing Figures

SELF-LUMINESCENT LIGHT SOURCE FOR LIQUID CRYSTAL DISPLAY

BACKGROUND OF THE INVENTION

This invention relates to a self-luminescent light source which provides a night display of a liquid crystal display watch.

A field effect type liquid crystal display element displays a character pattern by reflecting light from the outside with a reflector plate. Accordingly, the display function is lost in the night when it is dark outside.

There has been proposed and already known a liquid crystal display watch wherein, in order to overcome such a disadvantage, a plurality of self-luminescence type tubes containing tritium ($^3H$) gas and having inner walls coated with a fluorescent material are arrayed underneath the liquid crystal display element, thereby to permit the display in the nighttime.

However, the technique of enclosing the tritium gas into a tube is very difficult (refer to U.S. Pat. No. 3,817,733). Even when the gas is effectively enclosed and the tube is sealed, the gas leaks in due time and is feared to incur radioactive contamination. In addition, since several tubes are arrayed, the brightness at the boundary area between the adjacent tubes becomes low, and the light source exhibits a nonuniform brightness as a whole. A transmission type light scattering member may be placed on the tubes in order to avoid the drawback, but this inevitably renders the self-luminescent light source thick.

To the end of overcoming such disadvantages, it is considered that promethium ($^{147}Pm$) with which the manufacturing stage of work is comparatively easy and which is not feared to leak because it is solid is applied as the self-luminescent fluorescent material. However, $^{147}Pm$ gives out high-energy beta rays of 220 KeV. When a substance adapted to absorb the beta rays is interposed, bremsstrahlung is generated, and danger is sometimes involved in case of use in close contact with the human body as in a liquid crystal display wrist watch.

SUMMARY OF THE INVENTION

It is accordingly an object of this invention to provide a self-luminescent light source for a liquid crystal display watch which is improved in relation to the disadvantage of $^{147}Pm$ as stated above and is safe and which has a uniform brightness.

To the accomplishment of the above object, a self-luminescent light source for a liquid crystal display watch according to this invention is characterized by comprising a fluorescent substance layer which has a light reflectivity and which contains radioactive element promethium ($^{147}Pm$) in at least a part thereof, a reflective layer which is disposed on one surface of the fluorescent substance layer and which serves to reflect and scatter fluorescence from the fluorescent substance layer, a case which is disposed on the side of the reflective layer remote from the fluorescent substance layer and which serves to perform shielding from bremsstrahlung ascribable to beta rays given out from the promethium, a first cover which is disposed on the side of the fluorescent substance layer remote from the reflective layer and which serves to absorb the beta rays given out from the promethium and to transmit the light from the fluorescent substance layer, and a second cover which is disposed on the side of the first cover remote from the fluorescent substance layer and which serves to perform shielding from bremsstrahlung ascribable to the beta rays given out from the promethium and to transmit the light from the fluorescent substance layer.

DESCRIPTION OF THE PREFERRED EMBODIMENT

Figure 1:
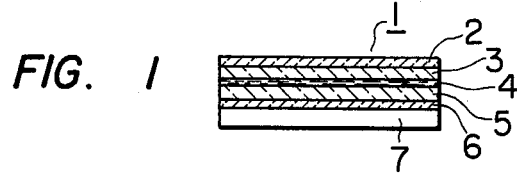
FIG. 1 is a sectional view showing the general construction of a display element for a liquid crystal watch which employs a self-luminescent light source according to this invention.
Figure 2:
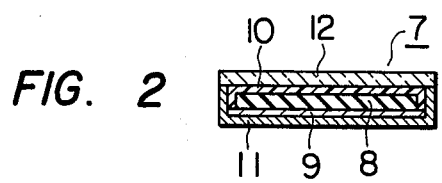
FIG. 2 is a sectional view showing a specific construction of the self-luminescent light source in FIG. 1.

FIG. 1 shows a section of a display element for a liquid crystal display watch which is constructed by employing a self-luminescent light source according to this invention. Referring to the figure, numeral 1 designates the entire display element for a liquid crystal display watch, and numeral 2 an upper polarization plate. Numeral 3 designates an upper glass plate, the lower surface of which is vapor-coated with transparent conductive electrodes corresponding to numerals and letters to-be-displayed. Shown at 4 is a layer of a nematic liquid crystal material. Numeral 5 indicates a lower glass plate, the upper surface of which is provided with transparent conductive electrodes corresponding to those disposed on the upper glass plate 3. Numeral 6 indicates a lower polarization plate. The upper polarization plate 2 and the lower polarization plate 6 are arranged so that their polarizing directions may intersect orthogonally to each other. Shown at 7 is the self-luminescent light source according to this invention, the detailed view of which is given to FIG. 2. Referring to FIG. 2, numeral 8 denotes a flap plate of a self-luminescent fluorescent substance such as ZnS:Zn, ZnS:Cu or ZnS:Ag, which employs $^{147}Pm$ as a radiation source and which is usually fabricated by an application-printing process. Numeral 9 denotes a white reflective material which serves to reflect and scatter fluorescence emitted by beta rays and for which barium sulfate ($BaSO_4$) is recommended. The reasons for the recommendation are that $BaSO_4$ exhibits a high light reflectivity in a range of from the visible to ultraviolet regions and has an irregular reflection characteristic that is nearly ideal. Also, $BaSO_4$ is a stable substance which is difficult to change in quality even when it is held in close contact with a fluorescent substance, etc. Numeral 10 denotes a transparent high-polymer thin film such as polyvinyl film, which serves to absorb the beta rays. Reference numeral 11 designates a metallic case which is a base plate for the reflective material 9 and which also functions to perform shielding from bremsstrahlung produced when the beta rays are absorbed by a substance (the absorption takes place in the portions of the flat plate of the self-luminescent fluorescent substance 8, the reflective layer 9, the transparent high-polymer thin film 10, etc.). For the metallic case 11, an aluminum sheet is recommended. Numeral 12 indicates a transparent glass plate which absorbs the bremsstrahlung and which also serves for causing the fluorescent substance plate 8 to function as a reflector. Desirable as the glass plate 12 is lead glass whose Pb-content is especially increased (e.g. from 0.5 to 20% by weight) so that the bremsstrahlung may be sufficiently absorbed even when the glass plate is thin. An acrylic resin such as polyacrylonitrile containing Pb is conveniently used because it absorbs the bremsstrahlung simultaneously with the beta-ray absorption. At the present time, however, the technique of raising the Pb concentration is not developed for the acrylic resin to the degree obtained by the lead glass. In the future, this technique will naturally be further developed.

Figure 3A:
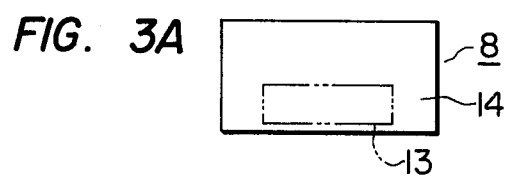
FIG. 3A is a plan view showing the fluorescent substance layer shown in FIG. 2.

FIG. 3A is a plan view of the flat plate of the self-luminescent fluorescent substance 8 shown in FIG. 2. Numeral 14 designates a surface which is coated with a fluorescent material ZnS:Cu), while numeral 13 indicates a surface which is coated with the fluorescent material (ZnS:Cu) mixed with promethium oxide ($Pm_2O_3$). As apparent from the upper glass plate 3 (FIG. 3B) shown in parallel with FIG. 3A, the promethium oxide is applied to only a region which corresponds to the time indicating portion of the liquid crystal display watch ("46 minutes past 12 o'clock" is indicated in the example shown in FIG. 3B).

The self-luminescent light source according to this invention is constructed as heretofore described. Therefore, the self-luminescent fluorescent substance plate does not play the role of a light source in the daytime and functions as a mere light reflector in which the outside is bright, and it functions as a plane light source in the nighttime.

Since the plate of the $^{147}Pm$ self-luminescent fluorescent substance is constructed to be flat, the nonuniformity in brightness as in the case of using the arrayal of the $^3H$-filled self-luminescent fluorescent tubes does not appear. Needless to say, any additional element such as the transmission type light scattering member for eliminating the nonuniformity of the brightness is not required at all. In consequence, the thickness of the whole light source becomes small, and the self-luminescent fluorescent substance plate becomes suitable for a wrist watch. In the embodiment of FIG. 2, self-luminescent light source 7 is about 0.9 mm in thickness. And flat plate 8 is about 0.2 mm, reflective layer 9 is about 0.1 mm, transparent high-polymer thin film 10 is about 0.5 mm, metallic case 11 is about 0.2 mm and glass plate 12 is about 0.35 mm in thickness. Owing to the shape of the flat plate, the application-printing is permitted, which is appropriate for mass production. Moreover, $^{147}Pm$ is mixed with the particles of the fluorescent material (ZnS:Cu) in the form of the solid oxide ($Pm_2O_3$). Therefore, even when the self-luminescent fluorescent substance plate is damaged, the radioactive element $^{147}Pm$ does not diffuse to the exterior and cause radioactive contamination as does the $^3H$ gas.

Further, the bremsstrahlung from the high-polymer film, the fluorescent material and the while reflector which absorb the beta rays of high energy are absorbed by the lead glass and the metallic case, and the X-ray emission to the exterior is prevented. Therefore, even when the self-luminescent light source is used for an appliance to be held in close contact with the human body, such as wrist watch, no danger is involved. Yet further, even when the self-luminescent light source is transported as the single component or assembled into a wrist watch, not only the beta rays but also the bremsstrahlung are intercepted by the single component itself, and hence, the light source can be safely handled even by an assembly manufacturer.

Figure 3B:
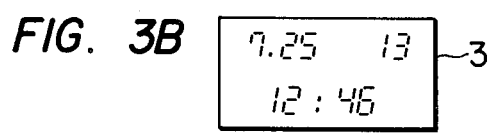
FIG. 3B is a plan view of an upper glass plate for explaining the corresponding relationship between the fluorescent substance layer shown in FIG. 3A and a liquid crystal display panel.

Moreover, the self-luminescent fluorescent substance is not applied over the entire surface of the flat plate of the self-luminescent fluorescent substance 8, but it is applied to only the numeral indicating portion 13 representative of "hour" or "hour and minute" as shown in FIGS. 3A and 3B. The remaining portion 14 for indicating, for example, "date", "a.m. or p.m." and "second" is coated with the ordinary fluorescent material which is of the same substance as that of the time indicating portion 13 and which does not contain $^{147}Pm$. With such a construction, even when a high concentration of $^{147}Pm$ (its radioactive intensity is about 500 u Ci.) is put into the time indicating portion 13, the radioactive intensity of the entire self-luminescent fluorescent substance flat plate 8 is suppressed within a prescribed value, and besides, the brightness of the time indicating portion 13 is enhanced to enhance the constrast of the time display. Since the time indicating portion 13 and the remaining portion 14 are coated with the same reflective material, they form a reflector plate of a reflection factor being uniform over the entire area in the daytime, so that a high display quality is attained in both the nighttime and the daytime.

We claim:

1. A self-luminescent light source for a liquid crystal display watch comprising a layer of fluorescent substance which has a light reflectivity and which contains in association with at least a part thereof radioactive element promethium ($^{147}Pm$), a reflective layer which is disposed on one surface of the fluorescent substance layer and which serves to reflect and scatter fluorescence from the fluorescent substance layer, a case which is disposed on the side of the reflective layer remote from the fluorescent substance layer and which serves to perform shielding from bremsstrahlung ascribable to beta rays given out from the promethium, a first cover which is disposed on the side of the fluorescent substance layer remote from the reflective layer and which serves to absorb the beta rays given out from the promethium and to transmit the light from the fluorescent substance layer, and a second cover, made of a material selected from the group consisting of lead-containing glass and lead-containing acrylic resin, which is disposed on the side of said first cover remote from the fluorescent substance layer and which serves to perform shielding from bremsstrahlung ascribable to the beta rays given out from the promethium and to transmit the light from the fluorescent substance layer, whereby said second cover and said case act as a shielding with respect to bremsstrahlung formed in the light source.

2. A self-luminescent light source for a liquid crystal display watch as defined in claim 1, wherein said fluorescent substance layer contains said promethium in only a region which corresponds to a time indicating portion of the watch.

3. A self-luminescent light source for a liquid crystal display watch as defined in claim 1, wherein said reflective layer is made of barium sulfate.

4. A self-luminescent light source of a liquid crystal display watch as defined in claim 1, wherein said case is made of a metal.

5. A self-luminescent light source for a liquid crystal display watch as defined in claim 1, wherein said first cover is made of a transparent high-polymer film.

6. A self-luminescent light source of a liquid crystal display watch as defined in claim 1, wherein said second cover is made of lead-containing glass.

7. A self-luminescent light source for a liquid crystal display watch as defined in claim 5, wherein said transparent high-polymer film is a polyvinyl film.

8. A self-luminescent light source for a liquid crystal display watch as defined in claim 4, wherein said metal is aluminum.

9. A self-luminescent light source for a liquid crystal display watch as defined in claim 6, wherein said lead-containing glass has a lead content of from 0.5 to 20.0% by weight.

10. A self-luminescent light source for a liquid crystal display watch as defined in claim 1, wherein said second cover is made of a lead-containing acrylic resin.

11. A self-luminescent light source for a liquid crystal display watch as defined in claim 10, wherein said acrylic resin is polyacrylonitrile.

12. A self-luminescent light source for a liquid crystal display watch as defined in claim 1, wherein the radioactive element promethium ($^{147}Pm$) is contained in said layer of fluorescent substance in the form of promethium oxide.

13. A self-luminescent light source for a liquid crystal display watch as defined in claim 1 or 12, wherein the promethium is a solid.

14. A self-luminescent light source for a liquid crystal display watch as defined in claim 13, wherein the promethium is mixed with said fluorescent substance.

15. A self-luminescent light source for a liquid crystal display watch as defined in claim 1, wherein said second cover and said case together surround said layer of fluorescent substance.

* * * * *